Patented July 8, 1930

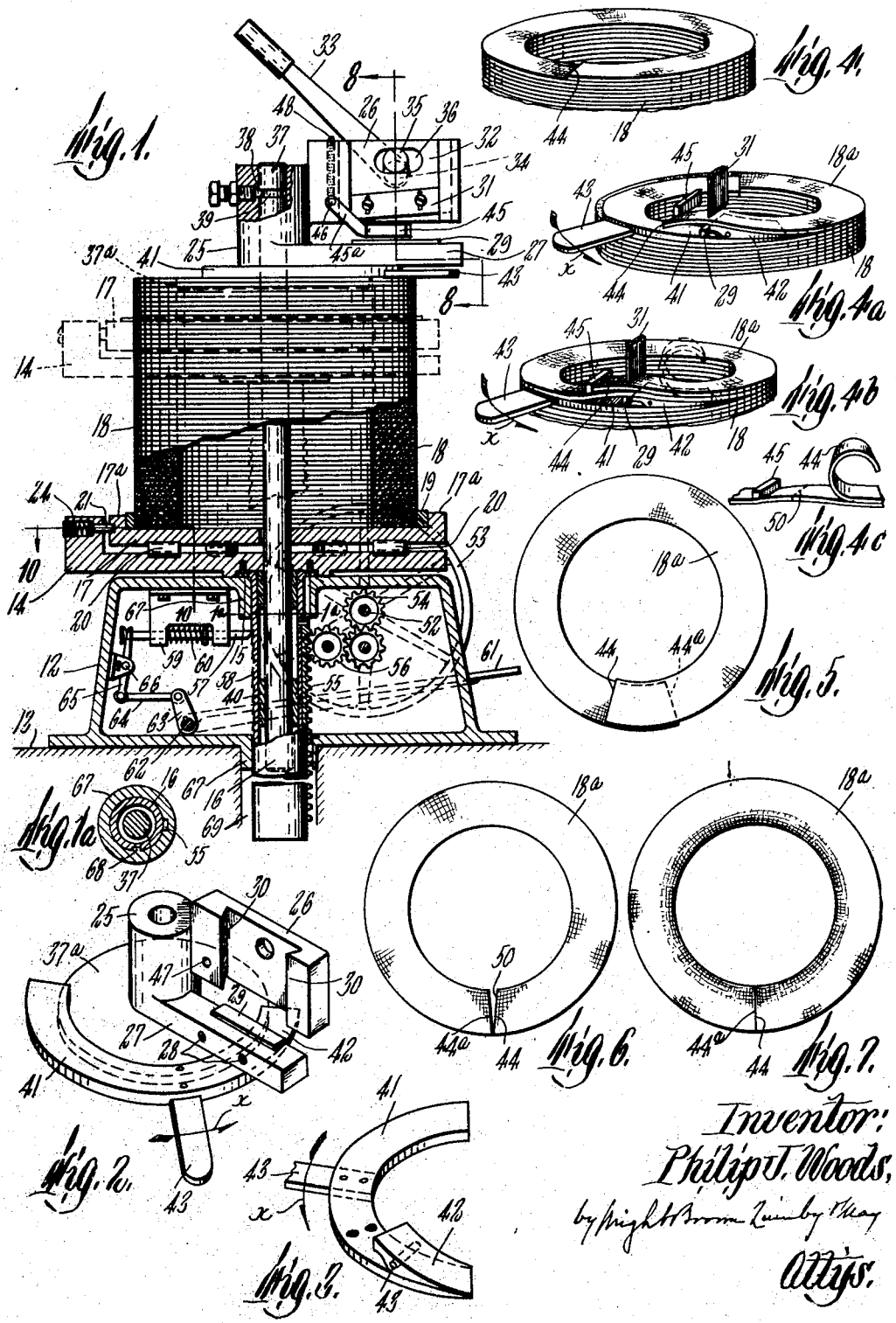

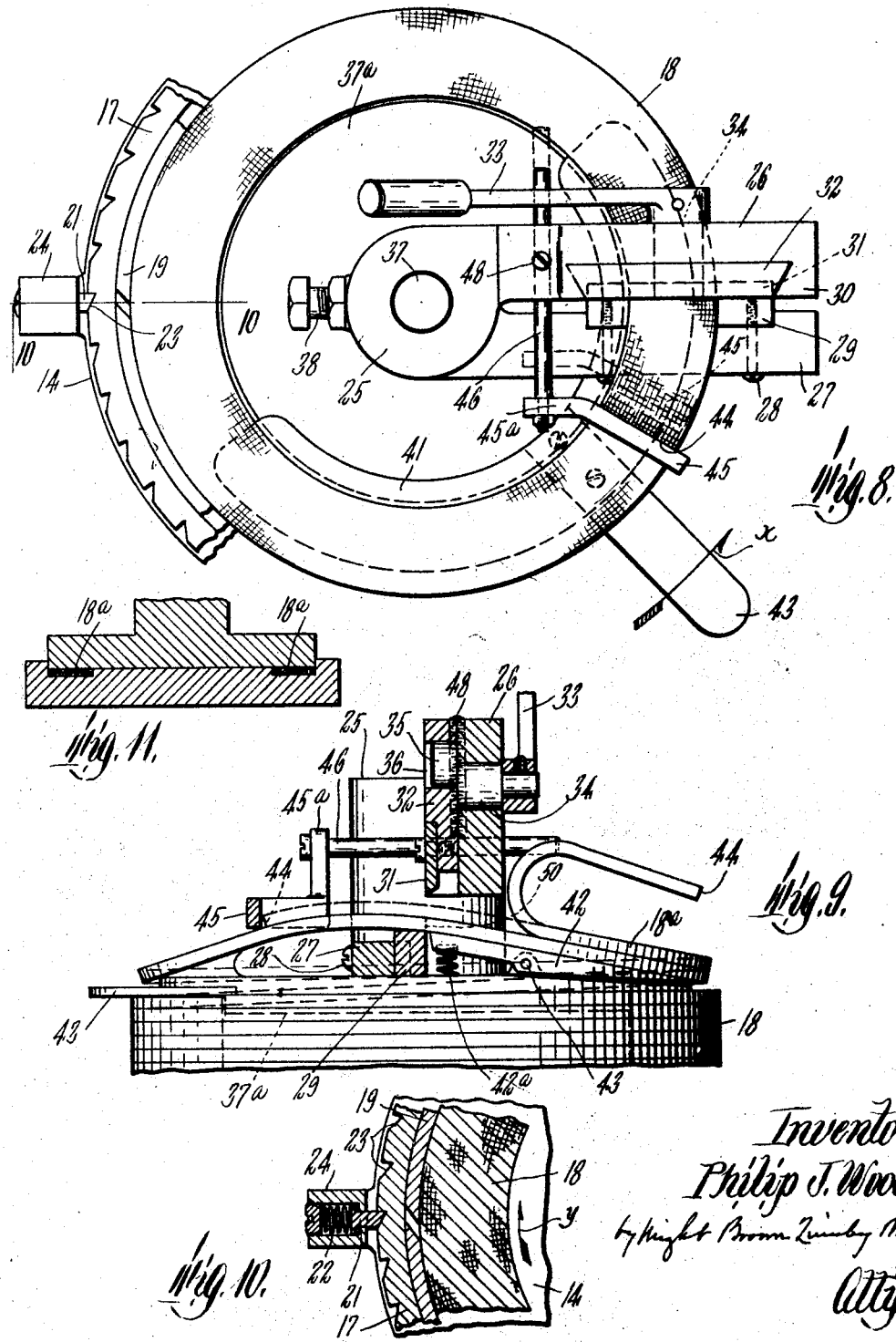

1,770,056

UNITED STATES PATENT OFFICE

PHILIP J. WOODS, OF REVERE, MASSACHUSETTS, ASSIGNOR OF ONE-HALF TO EDWARD J. ZIEGLER, OF BROOKLINE, MASSACHUSETTS

MEANS FOR MAKING COMPRESSIBLE FRICTION CLUTCH RINGS

Application filed October 22, 1929. Serial No. 401,540.

This invention relates to the manufacture of flat sided compressible rings constituting elements of a friction clutch, such as the well known clutch employed in a motor vehicle. A clutch ring to which the invention relates is composed usually of asbestos fabric impregnated with a viscous frictional composition. The fabric is woven as a strip of the desired width and of indeterminate length, and in accordance with common practice, is helically wound to form a tubular body which includes the material for a large number of rings, the external and internal surfaces of the body being formed by the edges of the strip, the sides of the strip convolutions being abutted together and adhering to each other, each convolution when detached from the body having an approximately annular form. It is customary in converting the tubular body into independent rings, to detach an end portion of the strip of sufficient length to form a lining ring and subject the detached portion to pressure, converting it into a flat sided ring, this operation being repeated until all the material of the strip has been converted into rings.

The methods heretofore practiced and the means employed in thus making clutch rings are such that some of the material is usually wasted and production is undesirably slow, no method and means having been heretofore devised, so far as I am aware, whereby the utilization of all the material of the body, formed by a helically wound strip, and the rapid and accurate conversion of the body into operative rings, are permitted.

The objects of my invention are to eliminate waste of material and ensure rapid production of accurately formed rings.

Of the accompanying drawings forming a part of this specification,—

Figure 1 shows partly in side elevation, and partly in vertical section, a machine embodying means for making clutch rings in accordance with my invention.

Figure 1ª is a section on line 1ª—1ª of Figure 1.

Figures 2 and 3 are perspective views, showing separately parts of the machine shown by Figure 1.

Figure 4 is a fragmentary perspective view, showing the upper end portion of a tubular body formed by a helically wound strip.

Figures 4ª, 4ᵇ and 4ᶜ are fragmentary perspective views partly illustrating the operation.

Figure 5 is a side view showing an incomplete ring as it appears when severed from the body and removed from the machine.

Figure 6 is a side view, showing the incomplete ring expanded to increase its diameter.

Figure 7 is a side view, showing a ring as completed by pressure after being expanded as shown by Figure 6.

Figure 8 is a top plan view, showing the machine on a larger scale.

Figure 9 is a fragmentary view, showing partly in section, the top portion of the machine, and a side view of the upper end portion of the body formed by the helically wound strip.

Figure 10 is a section on the plane indicated by line 10—10, Figures 1 and 8.

Figure 11 shows conventionally and in section, a press adapted to finish a ring.

The same reference characters indicate the same parts in all of the figures.

A machine suitable for use in carrying out my invention includes a base 12, which may be supported by a floor 13, and is preferably hollow and formed in cross section as shown by Figure 1. Supported by the base is a chuck holder or carrier 14, which is preferably vertically movable by means including a tubular standard 16, to which the carrier is fixed, as by screws 15, said standard being vertically movable in a central opening in the top of the base for a purpose hereinafter stated, means being provided for vertically moving the standard, and for preventing rotation thereof.

Supported by the carrier 14 is a chuck 17, which is rotatable on the carrier, for a purpose hereinafter stated, and is adapted to grasp and rotate a tubular body 18, formed by helically winding an elongated strip of frictioned compressible lining material, which, as before stated, is usually composed of impregnated asbestos fabric. An end portion 18ª of said strip, severed from the body 18, assumes the annular form shown by Figure 5, its ends overlapping said portion, constituting an incomplete clutch ring. The chuck may have any suitable means for grasping the lower end of the body 18. In this instance, the chuck is provided for this purpose with an annular curb 17ª, which backs a resilient split ring 19, forced under pressure into an annular space between the curb 17ª and the lower end of the body and compressed on the body. The chuck rests on anti-friction rolls 20, interposed between it and the carrier 14, said rolls providing an antifrictional thrust bearing cooperating with the carrier to support downward pressure exerted by the severing cutter hereinafter described, on the upper end of the body 18. Rotation of the chuck and the body 18 in one direction only (a clockwise direction in this instance, as indicated by the arrow $y$ (Figure 10)), is permitted by the means shown by Figure 10, said means including a dog 21 having a beveled end face and pressed by a spring 22 against the periphery of the carrier 17 and engaging notches 23 in the carrier, said notches having beveled faces conforming to the end face of the dog, the arrangement being such that the body and chuck may be manually rotated in the clockwise direction of the arrow $x$ in Figure 10, and are prevented from rotating in the opposite direction. The dog 21 and the spring 22 are housed in an ear 24 on the carrier 14.

When the tubular body 18 is engaged with and supported by the chuck 17, a detachable machine element which I call a strip raising and cutting head, is located in position to act on the upper end of the body 18, to raise the top convolution thereof from the next lower convolution, and transversely sever the strip to detach an incomplete ring from the body.

Said head includes a hub 25, and lower and upper arms 26 and 27 formed thereon, as best shown by Figure 2. To the lower arm 27 is fixed as by screws 28, a bed cutter 29. The arm 26 is provided with gibs 30, forming with the arm a guideway, in which a shearing cutter 31 is vertically movable to cooperate with the bed cutter 29 in severing the strip to detach an incomplete ring therefrom.

The shearing cutter is fixed to a slide 32, guided by the arm 26 and its gibs, and is reciprocated by manually operable means including a hand lever 33 and a short shaft 34 (Figure 9), journaled in a bearing in the head arm 26, and having an eccentric wristpin 35 entering a slot 36 in the slide 32.

The head hub 25 receives the upper end of a spindle 37, constituting a vertical axis on which the head is adapted to swing horizontally, the hub having a stud 38 (Figure 1) engaged with a peripheral groove 39 in the spindle. The spindle 37 is supported in a vertical position by a disk 37ª, fixed to the head and movable on the inner surface of the body 18, and sleeves or bearings 40 (Figure 1) fixed in the tubular standard 16, the spindle and the head engaged therewith being vertically movable.

The head includes means for raising a portion of the helical strip from the upper end of the body 18, and locating the raised portion between the bed cutter 29 and the shearing cutter 31, in position to be severed, said means comprising a segmental member 41, fixed preferably to the head arm 27, and an inclined wedge 42, pivoted at 43 to an ear on the member 41, one end of the wedge being yieldingly raised by a spring 42ª (Figure 9). Said member is adapted to bear on the upper end of the body 18, and has a handle 43, whereby it may be turned with the head in the clockwise direction indicated by the arrow $x$ in Figures 2 and 3, to force the wedge 42 under the exposed end face 44 (Figure 4) of the strip portion forming the top end of the body 18, thus raising a portion of the strip, and at the same time moving the bed cutter 29 under, and the shearing cutter 31 over, the raised portion, as shown by Figure 9, so that the cutter will sever the strip when the cutter 31 is forced downward.

The head is provided with a stop 45, adapted to abut the strip end face 44, as indicated by Figures 8 and 9, for a purpose stated hereinafter. Said stop is an arm having a shank 45ª, fixed to a rod 46 which is preferably movable in a socket 47 (Figure 2) in the head arm 26, to adjust the stop to different positions, as indicated by full and dotted lines in Figure 8, a set screw 48 (Figures 8 and 9) being provided to maintain the adjustment.

The body 18, which may be of any desired length, say from twenty-seven to thirty inches, is prepared by helically winding a strip on a cylindrical mandrel of smaller diameter than the inside diameter of the completed ring shown by Figure 7, the diameter of the mandrel being, for example, six and one-half inches when the internal diameter of the completed ring is to be seven inches.

The spindle 37 and the head engaged therewith, are first removed, and the body 18 is engaged with the chuck. The spindle and head are then replaced, the segmental member 41 of the head bearing on the top convolution of the body and exerting downward pressure thereon. The operator then grasps the handle 43 and turns the head in the counter clockwise direction indicated by arrow $x$, the knife 31 being raised, and the body 18 and the chuck being prevented from rotating in the same direction by the engagement of the dog 21 (Figure 10) with a chuck notch 23.

The wedge 42 advances under the exposed strip end face 44 and progressively raises the top convolution, breaking the adhesion between it and the next convolution. The stop 45 at this stage, passes over the strip end face 44, as indicated by Figure 4ª. The turning movement of the head and the forward movement of the wedge is continued until more than a complete convolution of the strip has been raised, as indicated by Figure 4ᵇ, the end face 44 being thus raised to position to abut the stop 45, as indicated by Figure 4ᵇ, and thus arrest the forward movement of the wedge. The stop is spaced from the path of the cutter 31, so that when the forward movement of the wedge is arrested, the raised end portion of the strip is located between the cutters and overlaps a raised portion beneath it. The operator now bends back the end portion of the strip, as indicated by dotted lines in Figure 4ᵇ, and by full lines in Figures 4ᶜ and 9, thus exposing the overlapped portion between the cutters. The cutter 31 is now forced downward by the operator and the cutters sever the exposed strip portion on the line 50 (Figures 4ᶜ and 9) so that the incomplete ring shown by Figure 5, is separated from the body, one of the end faces of said ring being the end face 44, and the opposite or second end face formed by the cutters being designated by 44ª.

The operator now removes the incomplete ring from the machine, restores the backwardly bent end portion to its original position, so that the ends of the ring overlap each other, and expands the ring as shown by Figure 6, causing the outer ends of the end faces 44 and 44ª to abut each other at the outer margin of the ring, said end faces being elsewhere separated from each other by a wedge-shaped gap 50, as shown by Figure 6.

The ring now has the desired operative external and internal diameter and is completed by placing it in a suitable press, shown by Figure 11, adapted to exert pressure on the flat sides to decrease the thickness of the ring without changing its diameter. The pressure thus exerted causes a sufficient distribution of the material to close the gap 50, as indicated by Figure 7, which shows the completed ring.

The operation of helically coiling the strip in forming the body 18, slightly increases the thickness of the inner edge portion of the strip, so that its sides are not exactly parallel. The pressing operation renders the sides parallel, and at the same time, so distributes some of the material of the thickened inner edge portion as to close the gap 50. The end faces 44 and 44ª are therefore closely abutted together and caused to adhere to each other in the completed ring.

It will now be seen that a compressible clutch ring is produced without waste of material, the ring having an exactly predetermined diameter, due to the cooperation of the stop 45 with the end face 44.

The object of the described means for permitting a clockwise turning of the chuck 17 and body 18, is to permit the operator to grasp and turn the body after the severing cut, to locate the strip end 44ª remaining on the body, in position to abut the stop 45 when the machine is operated as described, to produce another incomplete ring, the stop being spaced from the cutters as indicated by Figures 8 and 9. Said means is adapted, as described, to prevent a counter clockwise turning of the body and chuck, so that they cannot turn with the head when the latter is turned clockwise in the performance of its functions.

To compensate for the gradual reduction of the length of the body 18, and maintain its upper end at a convenient height, I provide manually operable means shown by Figure 1, for raising the carrier 14 and the chuck and body, from time to time, the preferred embodiment of said means being as next described.

Journaled in the base 12 is a shaft 52 having a hand wheel 53 and a gear 54. The tubular standard 16 is provided with teeth 55 constituting a vertical rack, with which meshes a gear 56. An intermediate gear 57 transmits torque from the gear 54 to the gear 56 when the shaft 52 is rotated by the operator, the arrangement being such that when the hand wheel 53 is rotated in one direction, the standard 16 is raised, and with it the chuck carrier, the chuck, and the body 18.

The standard 16 is confined against downward movement by the engagement of a dog 57 with ratchet teeth 58, on the standard, the dog being movable in guides 59 and pressed by a spring 60 toward the standard. When it is desired to release the standard and permit it to drop, the operator depresses a treadle lever 61, which is pivoted at 62 and has an arm 63 connected by a rod 64 with a lever 65 fulcrumed at 66 and engaged with the dog 57, the arrangement being such that when the treadle lever is depressed, the dog is retracted and releases the standard so that it is allowed to drop. The standard is guided vertically by guides 67 on the base, and said standard and the chuck carrier 14 are prevented from turning by means such as a rib 68 (Figure 1ª) on one of said guides entering a longitudinal slot in the standard. An opening 69 is provided in the floor 13 to permit a suitable downward movement of the standard.

I claim:

1. Means for use in making compressible clutch rings from a body composed of a helically coiled strip having a transverse end face exposed on one end of the body, said means comprising a chuck adapted to grasp one end of said body, and a strip raising and severing head adapted to bear on and be supported by the opposite end of the body and rotatable thereon, said head including an instrumentality for raising from the body the portion of the strip having said exposed end face, a cutting instrumentality for transversely severing the raised portion and forming a second transverse end face thereon, the severed portion constituting an incomplete ring, and a stop arranged to abut the exposed end face and cooperate therewith in locating the cutting instrumentality in position to form the second end face at a predetermined distance from the exposed end face, said distance determining the ultimate diameter of the ring.

2. Clutch-ring making means as specified by claim 1, the said head comprising a hub, a spindle engaged therewith and supported to constitute an axis coaxial with the chuck, whereby rotation of the head is permitted, lower and upper arms projecting laterally from the hub, a bed cutter fixed to the lower arm, a movable shearing cutter arranged to cooperate with the bed cutter, cutter operating mechanism including a slide carrying the movable cutter and guided by the upper arm, a hand lever fulcrumed on the upper arm, and operating connections between said lever and slide, a stop arm spaced from the path of the movable cutter, and a segmental member adapted to bear on an end of a body held by the chuck, and provided with a strip raising wedge, a handle being provided whereby the head may be rotated.

3. Clutch-ring making means as specified by claim 1, the said head comprising a hub, a spindle engaged therewith and supported to constitute an axis coaxial with the chuck, whereby rotation of the head is permitted, lower and upper arms projecting laterally from the hub, a bed cutter fixed to the lower arm, a movable shearing cutter arranged to cooperate with the bed cutter, cutter operating mechanism including a slide carrying the movable cutter and guided by the upper arm, a hand lever fulcrumed on the upper arm, and operating connections between said lever and slide, a stop arm spaced from the path of the movable cutter, and a segmental member adapted to bear on an end of a body held by the chuck, and a strip-raising wedge pivoted to said member and yieldingly supported at one end by a spring to guide a strip end face across the bed cutter.

4. Clutch-ring making means as specified by claim 1, comprising also a fixed base, a chuck carrier supported by the base and supporting the chuck, a standard fixed to the carrier and coaxial therewith and with the chuck, said standard being vertically movable in the base to raise and lower the carrier, manually operable means for raising the carrier and releasable detent means for permitting the descent of the carrier.

5. Clutch-ring making means as specified by claim 1, comprising also a fixed base, a chuck carrier supported by the base and supporting the chuck, a standard fixed to the carrier and coaxial therewith and with the chuck, said standard being vertically movable in the base to raise and lower the carrier, manually operable means for raising the carrier, and releasable detent means for permitting the descent of the carrier, the carrier being confined against rotation and the chuck being rotatable on the carrier, means being provided to permit rotation of the chuck in one direction only.

6. Clutch-ring making means as specified by claim 1, comprising also a fixed base, a chuck carrier supported by the base and supporting the chuck, a standard fixed to the carrier and coaxial therewith and with the chuck, said standard being vertically movable in the base to raise and lower the carrier, the standard being provided with a vertical rack, a shaft manually rotatable in the base, a gear meshing with the rack, and torque-transmitting connections between said gear and the shaft.

7. Clutch-ring making means as specified by claim 1, comprising also a fixed base, a chuck carrier supported by the base and supporting the chuck, a standard fixed to the carrier and coaxial therewith and with the chuck, said standard being vertically movable in the base to raise and lower the carrier, the standard being provided with a vertical rack, a shaft manually rotatable in the base, a gear meshing with the rack, torque-transmitting connections between said gear and the shaft, the standard being provided also with a vertically arranged ratchet, a spring pressed dog movably supported in the base and normally engaging said ratchet to prevent the descent of the standard, and means controlled by an operator for retracting the dog and permitting the descent of the standard.

In testimony whereof I have affixed my signature.

PHILIP J. WOODS.